United States Patent [19]

Chivallier et al.

[11] Patent Number: 5,799,914
[45] Date of Patent: Sep. 1, 1998

[54] CRADLE DEVICE FOR A PORTABLE RADIO TERMINAL

[75] Inventors: Laurent Chivallier, Yvré L'Evêque; Patrick Guerillot, Pontoise, both of France

[73] Assignee: U.S. Philips Corporation, New York, N.Y.

[21] Appl. No.: 778,226

[22] Filed: Jan. 8, 1997

[30] Foreign Application Priority Data

Jan. 10, 1996 [FR] France ................... 96 00215

[51] Int. Cl.$^6$ ................................. F16M 11/14
[52] U.S. Cl. .................. 248/176.1; 248/181.1; 248/181.2; 248/288.31; 224/929; 403/353
[58] Field of Search ............. 248/220.21, 221.11, 248/222.51, 224.8, 225.11, 229.1, 229.14, 231.61, 316.6, 222.11, 309.1, 916, 176.1, 181.1, 181.2, 223.31, 288.31, 288.51; 403/353; 224/929

[56] References Cited

U.S. PATENT DOCUMENTS

| | | | |
|---|---|---|---|
| 658,911 | 10/1900 | Hall | 248/181.1 |
| 1,288,461 | 12/1918 | Akeley | 248/181.1 |
| 5,069,407 | 12/1991 | Williams | 248/221.3 |
| 5,655,736 | 8/1997 | Kozloff et al. | 248/179.1 |

FOREIGN PATENT DOCUMENTS

| | | | |
|---|---|---|---|
| 000598561 | 12/1925 | France | 248/181.1 |
| 598561 | 12/1925 | France | 248/181.1 |
| 9419679 | 4/1995 | Germany. | |

*Primary Examiner*—Leslie A. Braun
*Assistant Examiner*—Kimberly T. Wood
*Attorney, Agent, or Firm*—Dicran Halajian

[57] ABSTRACT

A cradle device including a holder part for holding a portable radio terminal and a fixed part for releasably supporting the holder part. The fixed part has a ball joint accommodated thereon, the ball joint having a curved surface and an engaging surface, and a locking hook spaced from the ball joint and extending from the fixed part. The holder part has an aperture and a stopper extending into the aperture and a slot formed in the holder part and spaced from the aperture. The holder part assumes a locked position when the ball joint is accommodated in the aperture, the engaging surface engages the stopper and the hook extends into and engages the slot.

4 Claims, 2 Drawing Sheets

CRADLE DEVICE FOR A PORTABLE RADIO TERMINAL

The invention relates to a cradle device notably intended for a portable radio terminal comprising:
- a holder part in which the terminal comes to rest,
- a fixed part
- a fitting system for connecting the two parts and rendering said holder part removable.

This device finds important use notably in the field of motor cars for mounting a mobile radio terminal connected to a GSM network. Under these circumstances, one wishes to use his or her terminal under conditions of maximum comfort considering the rather noisy environment.

Such a device is described in European Patent document no. 0 617 535. Certain functions one expects from this type of device are performed by this known device. A first one of these functions consists of feeding the radio terminal once it is put in its holder, in order to save on often costly accumulators. A second important function is the function called handsfree function. Conversely, the known device does not back up a third function called private communications function. This type of communications implies that the handsfree system is deactivated, that the microphone and the loudspeaker of the terminal are used, that the first function is ensured and that, finally, the connection to the antenna of the vehicle is maintained.

This third function implies that the holder part which comprises means for ensuring the first function and maintaining the connection to the antenna, is separated from the fixed part during the private communication and connected to the fixed part at the end of this communication. The fitting system which permits of this separation and this repetitive connection is to satisfy several requirements. As the device is installed inside a motor car in most circumstances, the separation must not take place suddenly when there is a shock which is slightly heavy (for example 7 g). Another requirement resulting from the first requirement is that the fitting can easily be done correctly.

The present invention proposes a device of the type mentioned in the opening paragraph which largely satisfies above-mentioned requirements.

Therefore, such a device is characterized in that the fitting system is formed by:
- a ball joint fitted on one of the parts,
- an opening for permitting the engagement of said ball joint, provided in the other part,
- a flat positioning surface relative to said ball joint,
- a locking hook for locking the holder part onto the fixed part.

These and other aspects of the invention are apparent from and will be elucidated with reference to the embodiments described hereinafter.

Figure 1:
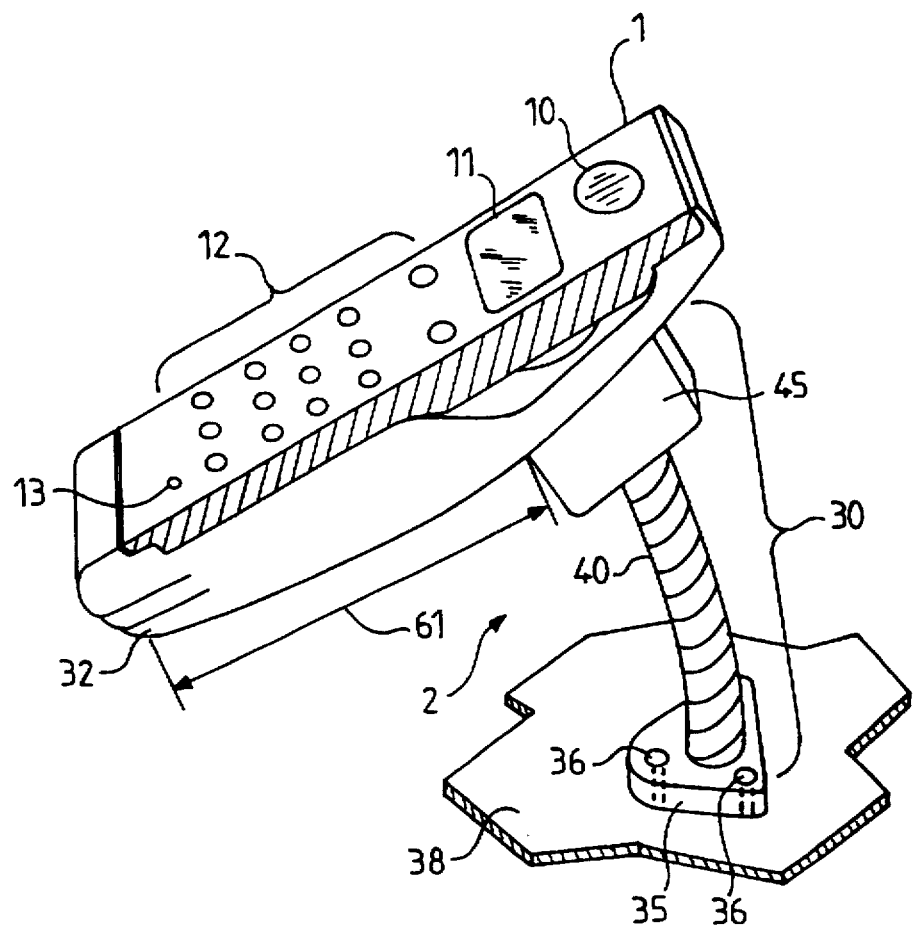
FIG. 1 shows a device and a radio terminal according to the invention.

In FIG. 1, reference 1 indicates a mobile radio terminal suitable for, for example, a GSM network. This terminal usually comprises: a loudspeaker 10, a display 11, a keypad 12 and a microphone 13. This terminal 1 is accommodated in the cradle device 2 according to the invention. This device comprises a fixed part 30 and a holder 32 in which the terminal 1 rests.

The fixed part 30 is formed by a base 35 which is fixed by bolts 36 on the flat surface 38 of the vehicle, a gooseneck 40 which allows the user to adapt the position of the cradle device as he or she likes and, finally, a base 45 on which said holder 32 rests.

Figure 2:
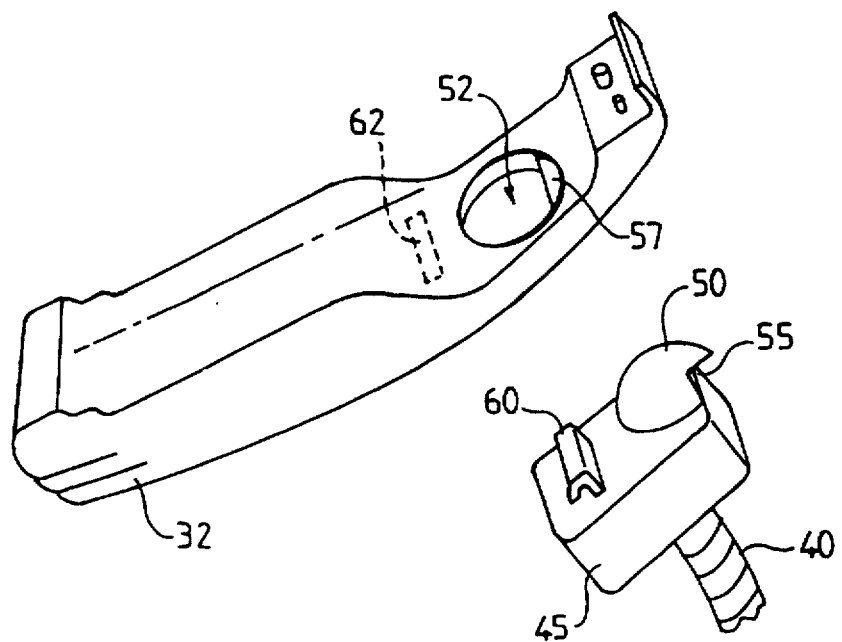
FIG. 2 shows only the device according to the invention, without the terminal.

FIG. 2 explains the fitting system of the holder 32 and of the fixed part 30. According to the invention, the system is formed by a ball joint 50 which is accommodated on the base 45, and by an opening 52 provided in the holder 32. A flat surface 55 provided in the ball joint makes it possible to determine the position of the holder with respect to the base. A stop 57 provided in the opening 52 is sunk in this flat surface 55. Once the holder has been positioned, a hook 60 can engage with a slot 62 provided in the non-visible surface of the holder 32 and shown in a dashed line in FIG. 2.

Thus, this fitting system according to the invention permits a first fixing which is easy due to the ball joint. A rotation around this ball joint permits of determining a position, so that when the holder is brought together with the base, there is immediately contact between the hook and its slot. The positioning of the hook finally locks the holder onto the fixed part.

A highly significant characteristic feature of the invention is that the fitting system is arranged in such a way that there is space 61 (FIG. 1) left free on the body of the holder, so that the hand of the user can easily take said holder.

Figure 3:
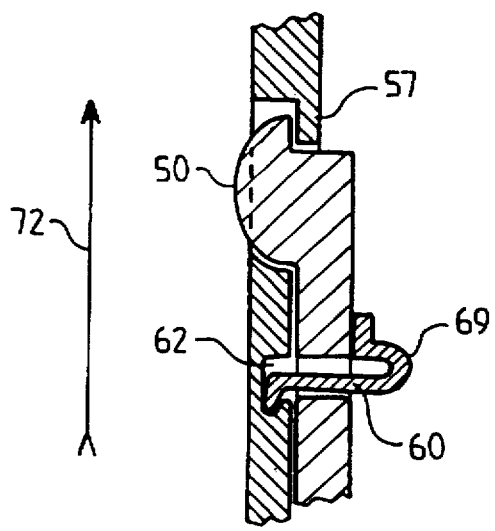
FIG. 3 shows in a cross-sectional view the fitting system which forms part of the device according to the invention.

FIG. 3 shows a cross-sectional view of the fitting system. In this Figure the elements common to those of the preceding Figures carry like references. In this FIG. 3, the hairpin form is to be noted of a part forming the spring 69 of the hook 60. Thus, this part 60 makes it possible to lock the holder 32 against the base 45 and permits, via a movement indicated by the arrow 72, to withdraw the holder from its position.

What is claimed:

1. A cradle device, said cradle device comprising:
   a holder part for holding a portable radio terminal and a fixed part for releasably supporting said holder part;
   said fixed part having
   a ball joint accommodated thereon, said ball joint having a curved surface and an engaging surface; and a locking hook spaced from said ball joint and extending from said fixed part;
   said holder part having
   an aperture and a stopper extending into said aperture; and a slot formed in said holder part and spaced from said aperture;
   wherein said holder part assumes a locked position when said ball joint is accommodated in said aperture, said engaging surface engages said stopper and said hook extends into and engages said slot.

2. The cradle device as claimed in claim 1, wherein said stopper is integrally formed with said holder part.

3. The cradle device as claimed in claim 1, wherein said locking hook includes a hairpin part so as to permit releasable engagement with said slot.

4. The cradle device as claimed in claim 1, wherein said holder part extends past said slot in a direction away from said aperture so as to define a space, said space sufficient to accommodate a hand of a user without said hand having to contact said fixed part.

* * * * *